US012804459B2

(12) United States Patent
Han et al.

(10) Patent No.: US 12,804,459 B2
(45) Date of Patent: Nov. 17, 2026

(54) METHODS AND APPARATUSES FOR SIDELINK CONSECUTIVE TRANSMISSION

(71) Applicant: Lenovo (Beijing) Limited, Beijing (CN)

(72) Inventors: Jing Han, Beijing (CN); Haipeng Lei, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 230 days.

(21) Appl. No.: 18/857,668

(22) PCT Filed: Apr. 19, 2022

(86) PCT No.: PCT/CN2022/087615
§ 371 (c)(1),
(2) Date: Oct. 17, 2024

(87) PCT Pub. No.: WO2023/201517
PCT Pub. Date: Oct. 26, 2023

(65) Prior Publication Data

US 2025/0274954 A1 Aug. 28, 2025

(51) Int. Cl.
*H04L 1/1867* (2023.01)
*H04L 5/00* (2006.01)
(Continued)

(52) U.S. Cl.
CPC ............. *H04W 28/04* (2013.01); *H04L 1/189* (2013.01); *H04L 1/1893* (2013.01); (Continued)

(58) Field of Classification Search
CPC ........... H04L 1/08–1896; H04L 5/0001–0098; H04W 4/30–80; H04W 28/02–065; (Continued)

(56) References Cited

U.S. PATENT DOCUMENTS

2021/0153173 A1 5/2021 Baek et al.
2026/0164459 A1* 6/2026 Di Girolamo ........ H04W 72/25

FOREIGN PATENT DOCUMENTS

CN 113225847 A 8/2021
CN 114286310 A * 4/2022 ............ H04W 72/02
CN 114342297 A 4/2022

OTHER PUBLICATIONS

PCT/CN2022/087615 , "International Search Report and Written Opinion", PCT Application No. PCT/CN2022/087615, Nov. 29, 2022, 6 pages.

* cited by examiner

*Primary Examiner* — Timothy J Weidner
(74) *Attorney, Agent, or Firm* — FIG. 1 Patents

(57) ABSTRACT

Disclosed are methods and apparatuses for consecutive transmission for different multiple medium access control (MAC) protocol data units (PDUs) for sidelink communication on an unlicensed band. An embodiment of the subject application provides a UE including: a processor; and a wireless transceiver coupled to the processor, herein the processor is configured to, with the wireless transceiver; determine a first number of consecutive resources for consecutive transmission of a second number of MAC PDUs; determine one or more MAC PDUs of the second number of MAC PDUs to be transmitted; select first consecutive resources for initial transmission of the one or more MAC PDUs from available resources indicated by a physical layer, wherein the first consecutive resources include at most the first number of consecutive resources; and select a corresponding second consecutive resources from remainder of the available resources for each retransmission of the one or more MAC PDUs.

20 Claims, 6 Drawing Sheets

(51) Int. Cl.

| | |
|---|---|
| ***H04W 28/02*** | (2009.01) |
| ***H04W 28/04*** | (2009.01) |
| ***H04W 72/02*** | (2009.01) |
| ***H04W 72/0446*** | (2023.01) |
| ***H04W 72/25*** | (2023.01) |
| ***H04W 72/40*** | (2023.01) |
| ***H04W 74/08*** | (2024.01) |
| ***H04W 74/0816*** | (2024.01) |
| ***H04W 84/02*** | (2009.01) |
| ***H04W 88/02*** | (2009.01) |
| ***H04W 92/02*** | (2009.01) |
| ***H04W 92/18*** | (2009.01) |

(52) U.S. Cl.
CPC .......... *H04L 5/0037* (2013.01); *H04L 5/0044* (2013.01); *H04W 28/0205* (2013.01); *H04W 72/02* (2013.01); *H04W 72/0446* (2013.01); *H04W 72/25* (2023.01); *H04W 72/40* (2023.01); *H04W 74/0816* (2013.01); *H04W 74/0875* (2013.01); *H04W 84/02* (2013.01); *H04W 88/02* (2013.01); *H04W 92/02* (2013.01); *H04W 92/18* (2013.01)

(58) Field of Classification Search
CPC ......... H04W 72/02–569; H04W 74/002–0891; H04W 84/005–22; H04W 88/005–188; H04W 92/02–24
See application file for complete search history.

METHODS AND APPARATUSES FOR SIDELINK CONSECUTIVE TRANSMISSION

TECHNICAL FIELD

The present disclosure generally relates to wireless communications, and especially to consecutive transmission for multiple different medium access control (MAC) protocol data units (PDUs) for sidelink (SL) communication.

BACKGROUND OF THE INVENTION

With the rapid development of "Internet of Things" (IoT) and other new user equipment (UE), the demand for supporting machine communications increases exponentially; however, the amount of licensed spectrum is limited. To meet the demand of this exponential increase in communications, additional spectrum (i.e. radio frequency spectrum) is needed; accordingly, communications providers need to look to unlicensed spectrum to meet the exponential increase in communication demand.

When unlicensed bands are used by a device, channel access procedures (e.g., Listen-Before-Talk procedures, LBT procedures) may be required to be performed by the device for looking for a channel that the device is allowed to operate on or to looking for a free radio channel to operate on. The LBT procedures are executed by performing energy detection on a certain channel. Only when the LBT procedures generate a success result can the device initiates data transmission(s) on the certain channel, which is also called the initiating device initiates a channel occupancy (CO). Then another device which receives the data from the initiating device and is known as a responding device can also perform data transmission(s) to the initiating device on the certain channel, and this is also called the responding device shares the CO. The CO refers to all the data transmission(s) between the initiating device and the responding device(s). These data transmission(s) can occupy the channel for a duration of time, which is known as a time duration of the CO or a COT (channel occupancy time) and is up to a maximum channel occupancy time (MCOT).

In New Radio-Unlicensed (NR-U), any downlink and uplink access have to follow the LBT channel access procedure, as unlicensed frequencies are also used by other networks such as WiFi. 3GPP (3$^{rd}$ Generation Partnership Project) has classified different LBT schemes according to four different LBT categories. The selection of LBT categories goes hand-in-hand with determining a suitable channel access priority class (CAPC). 3GPP has introduced four different CAPCs. Selecting the proper LBT type and determining a suitable CAPC is very important for transmission and reception of information in NR-U, e.g., for preamble transmission over physical random access channel (PRACH) in a random access channel (RACH) procedure.

According to current technology in the art for sidelink (SL) communication, if the MAC entity has selected to create a selected SL grant corresponding to transmission(s) of a single MAC PDU, and if SL data is available in a logical channel, or a SL channel state information (CSI) reporting is triggered, a user equipment (UE) may select a pool of resources, and perform transmission (Tx) resource (re-) selection check on the selected pool of resources.

SUMMARY

Some embodiments of the present disclosure provide a UE including: a processor and a wireless transceiver coupled to the processor, herein the processor is configured to, with the wireless transceiver: determine a first number of consecutive resources for consecutive transmission of a second number of MAC PDUs; determine one or more MAC PDUs of the second number of MAC PDUs to be transmitted; select first consecutive resources for initial transmission of the one or more MAC PDUs from available resources indicated by a physical layer, wherein the first consecutive resources include at most the first number of consecutive resources; and select a corresponding second consecutive resources from remainder of the available resources for each retransmission of the one or more MAC PDUs.

In some embodiments, the second number is determined based on at least one of: total available data to be transmitted and an estimated size for a single MAC PDU; a third number of different destinations of the total available data to be transmitted; or a fourth number of different HARQ feedback configurations for SL transmission.

In some embodiments, herein the first number of consecutive resources are determined within a remaining channel occupancy time (COT) duration by excluding a portion occupied by PSFCH from an available COT duration.

In some embodiments, the first number is determined based on at least one of the second number; or the COT duration.

In some embodiments, to determine the one or more MAC PDUs of the MAC PDUs to be transmitted in the consecutive resources, the processor is further configured to: in the case that the first number of consecutive resources is able to accommodate the second number of MAC PDUs, determine the one or more MAC PDUs to be the second number of MAC PDUs.

In some embodiments, to determine the one or more MAC PDUs of the MAC PDUs to be transmitted in the consecutive resources, in the case that the first number of consecutive resources are not able to accommodate the second number of MAC PDUs, the processor is further configured to: determine a transmission order of the second number of MAC PDUs; and determine the one or more MAC PDUs from the second number of MAC PDUs to be transmitted first according to the determined transmission order.

In some embodiments, the transmission order of the second number of MAC PDUs is determined based at least on one of: data arrival time of a highest priority logical channel (LCH) of each of the second number of MAC PDUs or triggered time of MAC control elements (CEs) of each of the second number of MAC PDUs; a remaining PDB of the highest priority LCH for each of the second number of MAC PDUs or a latency requirement of the triggered MAC CEs for each of the second number of MAC PDUs; a priority of the highest priority LCH or a priority of the triggered MAC CEs of each of the second number of MAC PDUs; or a CAPC of the highest priority LCH or a CAPC of the triggered MAC CEs for each of the second number of MAC PDUs.

In some embodiments, before selecting the first consecutive resources for the one or more MAC PDUs and selecting the second consecutive resources for each retransmission of the one or more MAC PDUs, the processor is configured to: determine a unified frequency resource number and a unified remaining PDB for each of the one or more MAC PDUs; notify the determined unified frequency resource number and the determined unified remaining PDB to a physical layer for determining the available resources by the physical layer; and be notified about the available resources by the physical layer.

In some embodiments, the unified frequency resource number for each of the one or more MAC PDUs is determined based on at least one of: a frequency resources number of an MAC PDU with a largest number of frequency resources among the one or more MAC PDUs; a frequency resource number of a MAC PDU which has an LCH with a highest priority among LCHs of the one or more MAC PDUs; or a frequency resource number of a MAC PDU with a highest CAPC priority among the one or more MAC PDUs.

In some embodiments, the unified remaining PDB for each of the one or more MAC PDUs is determined based on at least one of: a smallest remaining PDB among remaining PDBs of the one or more MAC PDUs; a remaining PDB of an MAC PDU which has an LCH with a highest priority among LCHs of the one or more MAC PDUs; or a remaining PDB of an MAC PDU with a highest CAPC priority among the one or more MAC PDUs.

In some embodiments, a fifth number initially equates to the first number, and to select the first consecutive resources from the available resources, the processor is further configured to: A) look for the fifth number of consecutive resources within the available resources; B) after operation A), select the found fifth number of consecutive resources to be the first consecutive resources for initial transmission of the one or more MAC PDUs, in the case that there are the fifth number of consecutive resources within the available resources and the fifth number is greater than zero; and C) after operation A), update the fifth number by decreasing the fifth number by 1 and perform A) again, in the case that there are no the fifth number of consecutive resources within the available resources.

In some embodiments, to select the corresponding second consecutive resources from the remainder of the available resources for each retransmission of the one or more MAC PDUs, the processor is further configured to: determine a corresponding retransmission number for retransmission of each of the one or more MAC PDUs; determine a corresponding sixth number of consecutive resources for each retransmission of the one or more MAC PDUs according to the determined corresponding retransmission number of each of the one or more MAC PDUs; and select the corresponding second consecutive resources for each retransmission of the one or more MAC PDUs from the remainder of the available resources according to the determined corresponding sixth number of consecutive resources for each retransmission of the one or more MAC PDUs.

In some embodiments, the corresponding retransmission number for each of the one or more MAC PDUs is a unified HARQ retransmission number determined based on at least one of: a largest HARQ retransmission number among all HARQ retransmission numbers of the one or more MAC PDUs; an HARQ retransmission number of an MAC PDU of the one or more MAC PDUs which has an LCH having a highest priority among all LCHs of the one or more MAC PDUs; an HARQ retransmission number of an MAC PDU of the one or more MAC PDUs which has a highest CAPC priority among the one or more MAC PDUs; or an HARQ retransmission number of an MAC PDU of the one or more MAC PDUs which has a lowest CAPC priority among the one or more MAC PDUs; and each corresponding sixth number is determined to be the first number.

In some embodiments, the corresponding retransmission number for each of the one or more MAC PDUs is a corresponding HARQ retransmission number for each of the one or more MAC PDUs; and each corresponding sixth number is determined according to a corresponding total HARQ retransmission number of each retransmission of the one or more MAC PDUs.

In some embodiments, the processor is further configured to indicate a seventh number in an SCI, wherein the seventh number indicates a number of consecutive resources for consecutive transmission of the one or more MAC PDUs, and wherein: for initial transmission of the one or more MAC PDUs, the seventh number is initially set to be the first number; and for each retransmission of the one or more MAC PDUs, the seventh number is initially set to be the corresponding sixth number for each retransmission of the one or more MAC PDUs.

In some embodiments, the seventh number is decreased by 1 in response to that a listen before transmission (LBT) failure happens before a last consecutive transmission.

In some embodiments, the processor is further configured to determine a CAPC value for LBT before performing consecutive transmission of the one or more MAC PDUS.

In some embodiments, in the case that an LBT failure happens for a resource of a number of consecutive resources, the processor is configured to: determine the CAPC value for LBT according to all CAPC values of a portion of the one or more MAC PDUs to be transmitted in remaining consecutive resources of the number of consecutive resources.

In some embodiments, the CAPC value is determined according to at least one of: a highest CAPC value among all CAPC values of the portion of the one or more MAC PDUs; a CAPC value of an MAC PDU that has an LCH having a highest priority among all LCHs of the portion of the one or more MAC PDUs; or a CAPC value of an MAC PDU with a remaining PDB or latency requirement among the portion of the one or more MAC PDUs.

In some embodiments, in the case that an LBT failure happens for at least one resource of a number of consecutive resources, the processor is configured to: determine the CAPC value for LBT among all CAPC values of the one or more MAC PDUs that to be transmitted in the number of consecutive resources.

In some embodiments, the CAPC value is determined according to at least one of: a highest CAPC value among all CAPC values of the one or more MAC PDUs; a CAPC value of an MAC PDU that has an LCH having a highest priority among the one or more MAC PDUs; or a CAPC value of an MAC PDU with a remaining PDB or latency requirement among the one or more MAC PDUs.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

Figure 1:
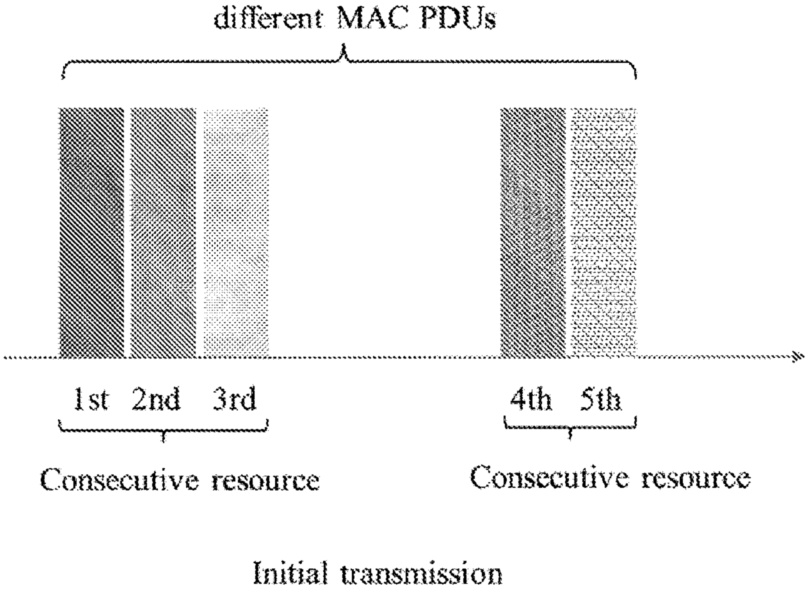
FIG. 1 illustrates a consecutive transmission example for multiple different MAC PDUs for SL communication according to some embodiments of the present disclosure.

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

While operations are depicted in the drawings in a particular order, persons skilled in the art will readily recognize that such operations need not be performed in the particular order as shown or in a sequential order, or that all illustrated operations need be performed, to achieve desirable results; sometimes one or more operations can be skipped. Further, the drawings can schematically depict one or more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing can be advantageous.

Reference will now be made in detail to some embodiments of the present disclosure, examples of which are illustrated in the accompanying drawings. To facilitate understanding, embodiments are provided under specific network architecture and new service scenarios, such as the $3^{rd}$ generation partnership project (3GPP) 5G (NR), 3GPP long-term evolution (LTE), and so on. It is contemplated that along with the developments of network architectures and new service scenarios, all embodiments in the present disclosure are also applicable to similar technical problems; and moreover, the terminologies recited in the present disclosure may change, which should not affect the principle of the present disclosure.

According to some embodiments of the present disclosure, a UE is configured to be able to perform SL transmission in mode 2 (i.e. UE autonomous resource selection mode). In some embodiments, the UE performs SL transmission in mode 2 on unlicensed band; the UE requires performing LBT before each SL transmission burst without a gap between the LBT and the SL transmission in time domain and obtains a COT duration.

According to some embodiments of the present disclosure, the SL communication may be consecutive transmission for multiple different MAC PDUs; in other words, each SL transmission is for one or more different MAC PDUs. Herein, the consecutive transmission may be initial transmission of the multiple different MAC PDUs, or retransmission(s) of the multiple different MAC PDUs; for each retransmission of the multiple different MAC PDUs, a port or all of the multiple different MAC PDUs will be retransmitted, depending upon a corresponding retransmission number of each of the multiple different MAC PDUs.

FIG. 1 illustrates a consecutive transmission example for multiple different MAC PDUs for SL communication. As shown in FIG. 1, the UE finds 3 consecutive resources in time domain, selects 3 different MAC PDUs from five different MAC PDUs, and transmits the 3 selected MAC PDUs; later, the UE finds 2 consecutive resources in time domain and transmits the left two MAC PDUs. It is contemplated that the present disclosure supports consecutive retransmission for multiple different MAC PDUs.

Figure 2:
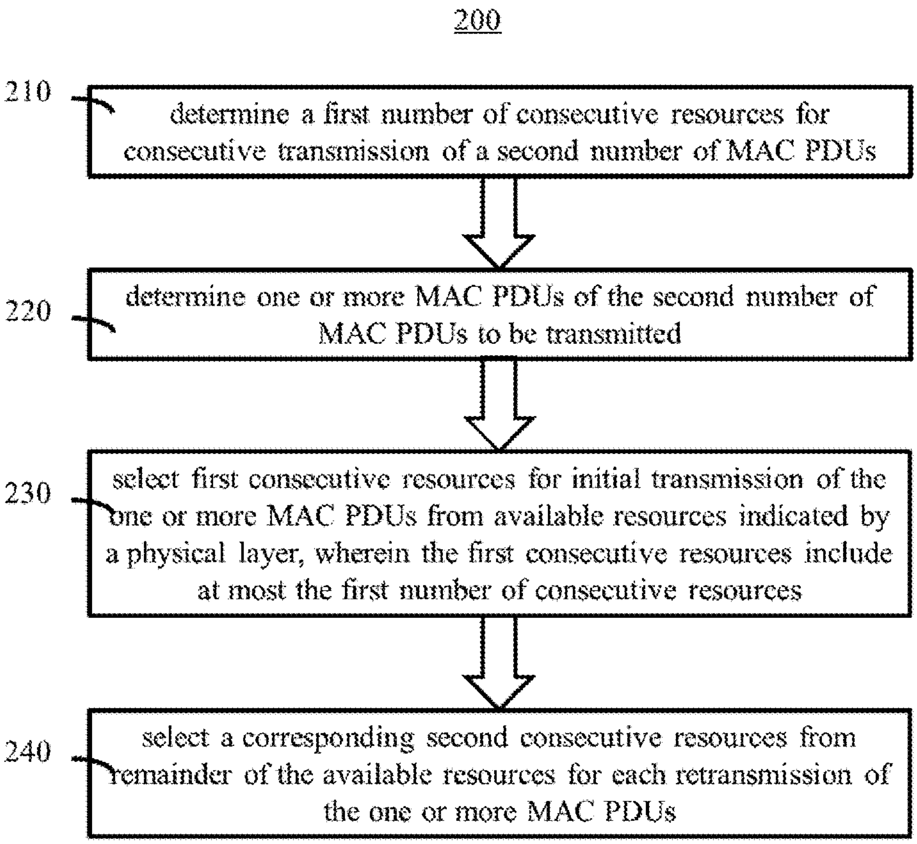
FIG. 2 illustrates an exemplary method performed by a UE according to some embodiments of the present disclosure.

FIG. 2 illustrates an exemplary method 200 performed by a UE for consecutive transmission according to some embodiments. As illustrated in FIG. 1, method 200 includes operation 210, operation 220, operation 230, and operation 240.

In some embodiments, in operation 210, the UE determines a first number for consecutive transmission of a second number of different MAC PDUs; herein the first number is a number of consecutive resources in time domain for transmission of the second number of different MAC PDUs.

In some embodiments, in operation 220, the UE determines or selects one or more MAC PDUs to be transmitted within the second number of MAC PDUs; in some embodiments, the remaining MAC PDUs will to be transmitted later.

In some embodiments, in operation 230, the UE selects first consecutive resources for initial transmission of the one or more MAC PDUs from available resources indicated by a physical layer; herein the first consecutive resources include at most the first number of consecutive resources.

In some embodiments, in operation 240, after the first consecutive resources are selected, the UE selects a corresponding second consecutive resources from remainder of the available consecutive resources for each retransmission of the one or more MAC PDUs; in each retransmission, the UE retransmits a portion of the one or more MAC PDUs according to a corresponding retransmission number of each of the one or more MAC PDUs.

In some embodiments, in operation 210, the second number is determined based on at least one of:

- total available data to be transmitted and an estimated size for a single MAC PDU;
  - for example, the second number equates to the result of the total available data divided by the estimated size for a single MAC PDU;
- a third number of different destinations of the total available data to be transmitted;
  - for example, the second number equates to the third number; or
- a fourth number of different HARQ feedback configurations for SL transmission.

In some embodiments, in operation 210, the UE determines the first number of consecutive resources within an available COT duration for consecutive SL transmission on e.g., unlicensed band. In some embodiments, the available COT duration is shared by other SL UEs, or obtained by itself in before. In some embodiments, the first number of consecutive resources are determined within a remaining COT duration by excluding a portion occupied by PSFCH therefrom from the available COT duration; in some embodiments, the remain COT duration is a portion of the available COT duration that is occupied by PSSCH and/or PSCCH transmission.

In some embodiments, in operation 210, the first number is determined based on at least one of: the determined second number, or the COT duration. In some embodiments, the UE determines the first number according to the determined second number; for example, the first number is determined to be equal to the second number. In some other embodiments, the UE determines the first number according to the determined remaining COT duration; for example, the first number is set to be equal to the resource number of the resources included in the remaining COT duration. In other further embodiments, the UE determines the first number according to a minimum value of {the second number, the resource number of the resources included in the remaining COT duration}.

In some embodiments, in operation 220, if the determined first number of consecutive resources is able to accommodate the second number of MAC PDUs, the UE determines that the one or more MAC PDUs are the second number of MAC PDUs.

In some embodiment, in operation 220, if the determined first number of consecutive resources is not able to accommodate all the second number of MAC PDUs, the UE needs to select a portion of the second number of MAC PDUs to transmit first. In some embodiments, the UE needs to first determine a transmission order of the second number of MAC PDUs, and then determine the one or more MAC PDUs from the second number of MAC PDUs to be transmitted first according to the determined transmission order. After transmitting the one or more MAC PDUs, if there are still MAC PDU(s) that are not transmitted, the UE may transmit them later.

In some embodiments, the transmission order of the second number of MAC PDUs is determined based at least on one of:

- data arrival time of a highest priority LCH of each of the second number of MAC PDUs or triggered time of MAC CEs of each of the second number of MAC PDUs;
- a remaining PDB of the highest priority LCH for each of the second number of MAC PDUs or a latency requirement of the triggered MAC CEs for each of the second number of MAC PDUs;
- a priority of the highest priority LCH or a priority of the triggered MAC CEs of each of the second number of MAC PDUs; or
- a CAPC of the highest priority LCH or a CAPC of the triggered MAC CEs for each of the second number of MAC PDUs.

In some embodiment of method 200, before performing operation 230 (i.e., selecting the first consecutive resources for the one or more MAC PDUs) and operation 240 (selecting the second consecutive resources for each retransmission of the one or more MAC PDUs), the UE needs to notify its requirement for the resource(s) to the physical layer and needs to know what resources that the physical layer can provide. In some embodiments, the UE is configured to:

- determine a unified frequency resource number and a unified remaining PDB for each of the one or more MAC PDUs;
- notify the determined unified frequency resource number and the determined unified remaining PDB to a physical layer for determining the available resources by the physical layer; and
- be notified about the available resources by the physical layer; it is contemplated that the available resources notified by the physical layer may not have the first number of consecutive resources.

In some embodiments, the UE may determine the unified frequency resource number for each of the one or more MAC PDUs based on at least one of:

- a frequency resources number of an MAC PDU with a largest number of frequency resources among the one or more MAC PDUs;
  - for example, there are three MAC PDUs (MAC PDU1, MAC PDU2, and MAC PDU3) to be transmitted, if a determined frequency resource number for MAC PDU1 is N1, a determined frequency resource number for MAC PDU2 is N2, a determined frequency resource number for MAC PDU3 is N3, then the UE may determine the maximum value of {N1, N2, N3} as the unified frequency resource number for the physical layer to determine available resources;
- a frequency resource number of a MAC PDU which has an LCH with a highest priority among LCHs of the one or more MAC PDUs;
  - for example, there are three MAC PDUs (MAC PDU1, MAC PDU2, and MAC PDU3) to be transmitted, if a determined frequency resource number for MAC PDU1 is N1, a determined frequency resource number for MAC PDU2 is N2, and a determined frequency resource number for MAC PDU3 is N3; furthermore, MAC PDU2 has the highest priority LCH among all LCHs of all the three MAC PDUs, then the UE may determine N2 to be the unified frequency resource number for the physical layer to determine available resources; or
- a frequency resource number of a MAC PDU with a highest CAPC priority among the one or more MAC PDUs;
  - for example, there are three MAC PDUs (MAC PDU1, MAC PDU2, and MAC PDU3) to be transmitted, if a determined frequency resource number for MAC PDU1 is N1, a determined frequency resource number for MAC PDU2 is N2, and a determined frequency resource number for MAC PDU3 is N3; furthermore, MAC PDU1 has the highest CAPC among all CAPCs of all the three MAC PDUs, then the UE may determine N1 to be the unified frequency resource number for the physical layer to determine available resources.

In some embodiments, the UE may determine the unified remaining PDB for each of the one or more MAC PDUs based on at least one of:

- a smallest remaining PDB among remaining PDBs of the one or more MAC PDUs;
  - for example, there are three MAC PDUs (MAC PDU1, MAC PDU2, and MAC PDU3) to be consecutively transmitted, if a determined remaining PDB for MAC PDU1 is T1, a determined frequency resource number for MAC PDU2 is T2, a determined frequency resource number for MAC PDU3 is T3, then the UE may determine the smallest value of {T1, T2, T3} as the unified remaining PDB for the physical layer to determine available resources;
- a remaining PDB of an MAC PDU which has an LCH with a highest priority among LCHs of the one or more MAC PDUs;
  - for example, there are three MAC PDUs (MAC PDU1, MAC PDU2, and MAC PDU3) to be consecutively transmitted, if a determined remaining PDB for MAC PDU1 is T1, a determined remaining PDB for MAC PDU2 is T2, and a determined remaining PDB for MAC PDU3 is T3; furthermore, MAC PDU2 has the highest priority LCH among all LCHs of all the three MAC PDUs, then the UE may determine N2 to be the unified frequency resource number for the physical layer to determine available resources; or a remaining PDB of an MAC PDU with a highest CAPC priority among the one or more MAC PDUs;

for example, there are three MAC PDUs (MAC PDU1, MAC PDU2, and MAC PDU3) to be consecutively transmitted, if a determined frequency resource number for MAC PDU1 is N1, a determined frequency resource number for MAC PDU2 is N2, and a determined frequency resource number for MAC PDU3 is N3; furthermore, MAC PDU1 has the highest CAPC among all CAPCs of all the three MAC PDUs, then the UE may determine N1 to be the unified remaining PDB for the physical layer to determine available resources.

According to some embodiments of method 200, based on the determined unified frequency resource number and determined unified remain PDB for each of the one or more MAC PDUs, the physical layer determines or finds available resources for consecutive transmission of the one or more MAC PDUs. It is contemplated that the available resources may not contain the first number of consecutive resources in time domain.

In some embodiments, in operation 230, in the case that the physical layer finds or determines available resources, then the UE may try to select first consecutive resources for initial transmission of the one or more MAC PDUs from the available resources indicated by the physical layer; wherein the first consecutive resources include a fifth number of resources, and the fifth number is not greater than the first number.

Figure 3:
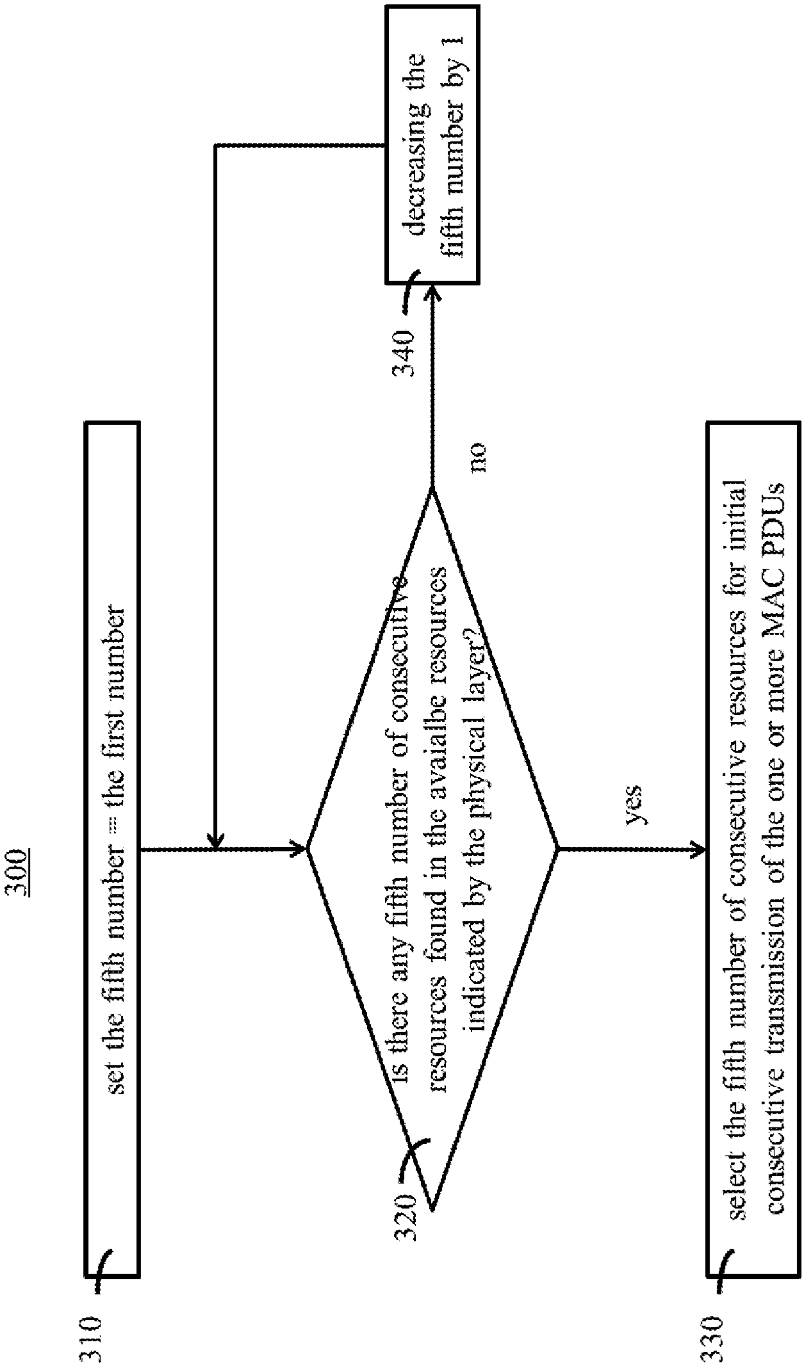
FIG. 3 illustrates an exemplary resource selection for initial transmission according to some embodiments of the present disclosure.

According to some embodiments of the present disclosure, the UE may perform a procedure 300 illustrated in FIG. 3 to select the first consecutive resources from the available resources indicated by the physical layer.

In step 310, the UE set the fifth number to be initially equal to the first number.

In step 320, the UE try to find or determine the fifth number of consecutive resources in the available resources indicated by the physical layer:

in the case that the UE finds or determines the fifth number of consecutive resources in time domain within the available resource, the UE performs step 330, i.e., the UE select the fifth number of consecutive resources in time domain for initially consecutive transmission of the one or more MAC PDUs; and in the case that the UE fails to find or determine the fifth number of consecutive resources in time domain within the available resource, the UE performs step 340, i.e., the UE decrease the fifth number by 1; after performing step 340, the UE performs step 320 again.

In some embodiments, if the UE find several resource blocks, each resource block has no less than the fifth number of consecutive resources, the UE may randomly select one of the resource block for initially consecutive transmission of the one or more MAC PDUs.

In some embodiments, after the performing of operation 230, if there are still remainder available resource within the available resources, the UE may perform operation 240 for each retransmission of the one or more MAC PDUs; herein, a retransmission of the one or more MAC PDUs means that the UE retransmits all or a portion of the one or more MAC PDUs on consecutive resources.

In some embodiments, in operation 240, before selecting a corresponding second consecutive resources from remainder of the available resources for each retransmission of the one or more MAC PDUs, the UE needs to determine:

the retransmission number for each of the one or more MAC PDUs, this is to determine how many times that the UE performs retransmission of the one or more MAC PDUs; and a corresponding sixth number of consecutive resources for each retransmission of the one or more MAC PDUs according to the determined corresponding retransmission number of each of the one or more MAC PDUs; it is contemplated that the six number is not greater than the first number.

Based at least on the determined retransmission number for each of the one or more MAC PDUs, the UE determines the total retransmission times for retransmission of the one or more MAC PDUs.

Based at least on the determined corresponding sixth number of consecutive resources for each retransmission of the one or more MAC PDUs, the UE may select the corresponding second consecutive resources for each retransmission of the one or more MAC PDUs from the remainder of the available resources.

In some embodiments, the UE sets or determines the corresponding retransmission number for each of the one or more MAC PDUs to be a unified HARQ retransmission number, and sets or determines each corresponding sixth number for each retransmission to be the first number, i.e., set the sixth number to equate to the first number. In some embodiments, the unified HARQ retransmission number is determined based on at least one of:

a largest HARQ retransmission number among all HARQ retransmission numbers of the one or more MAC PDUs;

for example, there are three MAC PDUs (MAC PDU1, MAC PDU2, and MAC PDU3) to be consecutively transmitted in time domain; if a determined HARQ retransmission number for MAC PDU1 is N1, a determined HARQ retransmission number for MAC PDU2 is N2, and a determined HARQ retransmission number for MAC PDU3 is N3, the UE determines a maximum value of {N1, N2, N3} to be the unified HARQ retransmission number for each of MAC PDU1, MAC PDU2, and MAC PDU3;

an HARQ retransmission number of an MAC PDU of the one or more MAC PDUs which has an LCH having a highest priority among all LCHs of the one or more MAC PDUs;

for example, there are three MAC PDUs (MAC PDU1, MAC PDU2, and MAC PDU3) to be consecutively transmitted in time domain; if a determined HARQ retransmission number for MAC PDU1 is N1, a determined HARQ retransmission number for MAC PDU2 is N2, and a determined HARQ retransmission number for MAC PDU3 is N3, and MAC PDU2 has a highest priority LCH among all the LCHs of the three MAC PDUs, the UE determines N2 to be the unified HARQ retransmission number for each of MAC PDU1, MAC PDU2, and MAC PDU3;

an HARQ retransmission number of an MAC PDU of the one or more MAC PDUs which has a highest CAPC priority among the one or more MAC PDUs;

for example, there are three MAC PDUs (MAC PDU1, MAC PDU2, and MAC PDU3) to be consecutively transmitted in time domain; if a determined HARQ retransmission number for MAC PDU1 is N1, a determined HARQ retransmission number for MAC PDU2 is N2, and a determined HARQ retransmission number for MAC PDU3 is N3, and MAC PDU3 has a highest CAPC priority among all CAPCs of the three MAC PDUs, the UE determines N3 to be the unified HARQ retransmission number for each of MAC PDU1, MAC PDU2, and MAC PDU3; or an HARQ retransmission number of an MAC PDU of the one or more MAC PDUs which has a lowest CAPC priority among the one or more MAC PDUs;

for example, there are three MAC PDUs (MAC PDU1, MAC PDU2, and MAC PDU3) to be consecutively transmitted in time domain; if a determined HARQ retransmission number for MAC PDU1 is N1, a determined HARQ retransmission number for MAC PDU2 is N2, and a determined HARQ retransmission number for MAC PDU3 is N3, and MAC PDU1 has a lowest CAPC priority among all CAPCs of the three MAC PDUs, then the UE determines N1 to be the unified HARQ retransmission number for each of MAC PDU1, MAC PDU2, and MAC PDU3.

Figure 4:
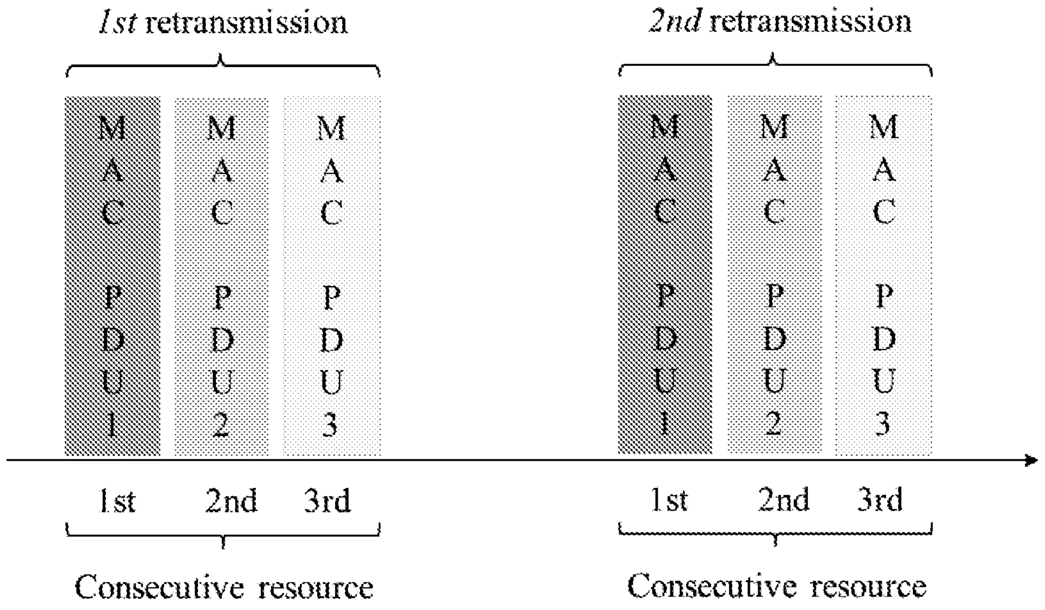
FIG. 4 illustrates an exemplary resource selection for retransmission according to some embodiments of the present disclosure.

For example, please refer to FIG. 4, herein the resource marked by a MAC PDU means that the resource is reserved for the transmission of the MAC PDU. In this example, there are three MAC PDUs (MAC PDU1, MAC PDU2, and MAC PDU3) to be consecutively retransmitted in time domain; the UE sets or determines the corresponding retransmission number for each of 3 MAC PDUs to be a unified HARQ retransmission number (e.g. 2), it means that the UE performs 2 times of retransmission of the 3 MAC PDUs; furthermore, the UE sets or determines a corresponding sixth number for each retransmission to be the first number (e.g., 3); then the UE performs twice the retransmission of the 3 MAC PDUs, and selects a 3 consecutive resources for each retransmission of the 3 MAC PDUs. In this example, for each retransmission of the 3 MAC PDUs, the UE finds or determines 3 consecutive resources in time domain within the available resources indicated by the physical layer.

In some embodiments, the UE sets or determines the corresponding retransmission number for each of the one or more MAC PDUs to be a corresponding HARQ retransmission number for each of the one or more MAC PDUs, and sets or determines a corresponding sixth number for each retransmission of the one or more MAC PDUs according to a corresponding total HARQ retransmission number of each retransmission of the one or more MAC PDUs; accordingly, the corresponding second consecutive resources for each retransmission of the one or more MAC PDUs has a corresponding sixth number of consecutive resources.

Figure 5:
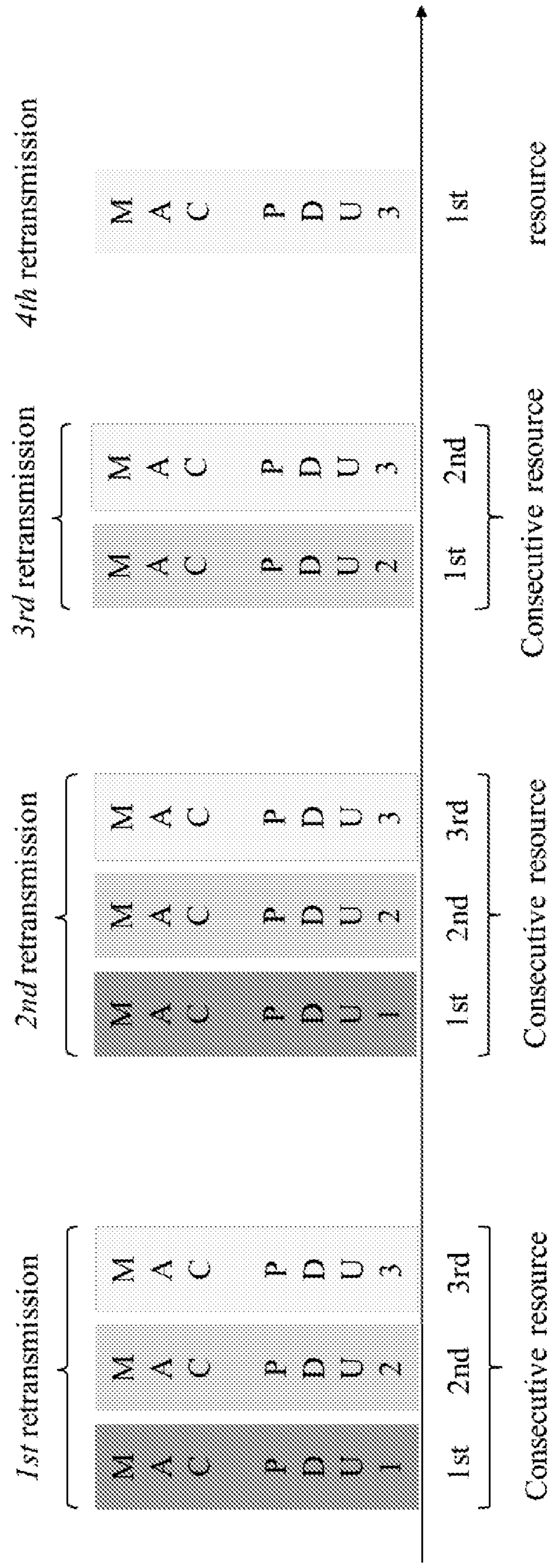
FIG. 5 illustrates an exemplary resource selection for retransmission according to some embodiments of the present disclosure.

For example, please refer to FIG. 5, herein the resource marked by a MAC PDU means that the resource is reserved for the transmission of the MAC PDU. In this example, there are three MAC PDUs (MAC PDU1, MAC PDU2, and MAC PDU3) to be consecutively transmitted in time domain; the retransmission number for MAC PDU1 is 2, the retransmission number for MAC PDU2 is 3, and the retransmission number for MAC PDU3 is 4. Then, the UE determines total 4 times the retransmission of the three MAC PDUs: in the first retransmission and the second retransmission, all the 3 MAC PDUs are retransmitted; in the third retransmission, MAC PDU2 and MAC PDU3 are retransmitted; and in the fourth retransmission, MAC PDU4 is retransmitted. In this example, for the $1^{st}$ retransmission, the six number is 3, the UE finds or determines 3 consecutive resources in the time domain for the $1^{st}$ retransmission; for the $2^{nd}$ retransmission, the six number is 3, the UE finds or determines 3 consecutive resources in the time domain for the $2^{nd}$ retransmission; for the $3^{rd}$ retransmission, the six number is 2, the UE finds or determines 2 consecutive resources in the time domain for the $3^{rd}$ retransmission; and for the 4th retransmission, the six number is 1, the UE finds or determines 1 resource for the 4th retransmission.

In some embodiments, the UE indicates a seventh number in an SCI, wherein the seventh number indicates a number of consecutive resources in time domain for consecutive transmission of the one or more MAC PDUs, and wherein:

for initial transmission of the one or more MAC PDUs, the seventh number is initially set to be the first number; and for each retransmission of the one or more MAC PDUs, the seventh number is initially set to be the corresponding sixth number for each retransmission of the one or more MAC PDUs;

wherein, in the case that the consecutive transmission (initial transmission or retransmission) is performed on unlicensed band, LBT will be executed before each consecutive transmission, the seventh number is decreased by 1 if an LBT failure occurs for a last consecutive transmission.

In other words, before an ith consecutive transmission of the one or more MAC PDUs on the seventh number of consecutive resources on unlicensed band, if an LBT for the ith consecutive transmission fails, then a corresponding seventh number for the ith consecutive transmission of the one or more MAC PDUs will be decreased by 1; herein i is an positive integer, if i is equal to 1, the consecutive transmission is an initial transmission of the one or more MAC PDUs, if i is greater than 1, the consecutive transmission is an (i-1)th retransmission of the one or more MAC PDUs. It is contemplated that the UE still needs to perform LBT for the ith consecutive again on the decreased consecutive resources.

Figure 6:
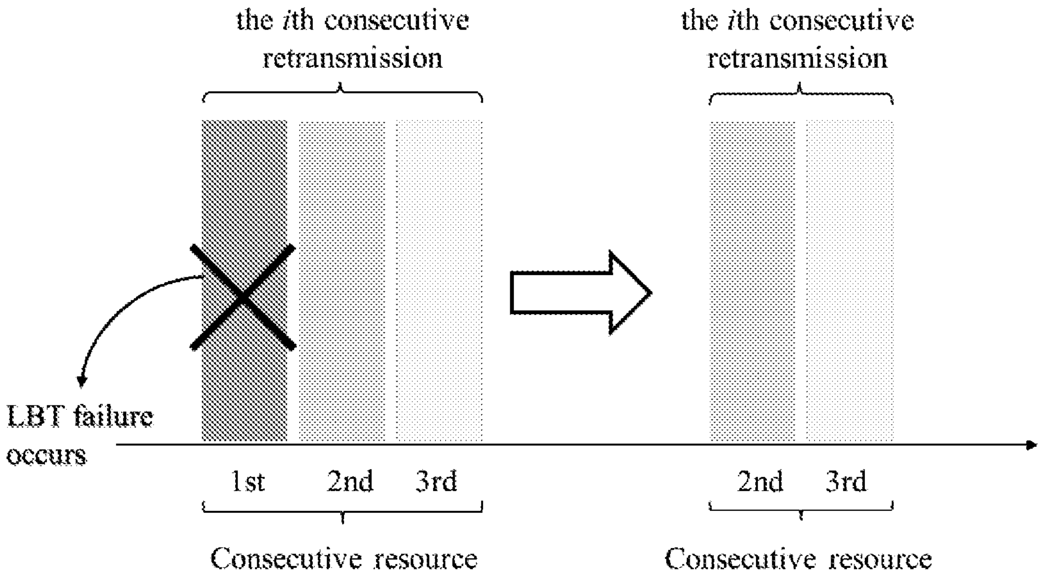
FIG. 6 illustrates an exemplary resource decrease due to LBT according to some embodiments of the present disclosure.

Please refer to FIG. 6 as an example. As shown in FIG. 6, there are 3 consecutive resources in time domain for an ith consecutive transmission of the one or more MAC PDUs. If an LBT failure occurs for the ith consecutive transmission, only two consecutive resources (i.e., the $2^{nd}$ resource and the $3^{rd}$ resource) in time domain are provided for the ith consecutive transmission of the one or more MAC PDUs; accordingly, an LBT for the two consecutive resources will be performed for the ith consecutive transmission.

In some embodiments, if an LBT for a consecutive transmission of one or more MAC PDUs fails, the UE will transmit all the one or more MAC PDUs on the remaining consecutive resources where the LBT successes. Please refer to FIG. 6 again, the one or more MAC PDUs will be transmitted on the $2^{nd}$ resource and the $3^{rd}$ resource, if the LBT for the $2^{nd}$ resource and the $3^{rd}$ resource successes.

In some embodiments, if an LBT for a consecutive transmission of one or more MAC PDUs fails, the UE will transmit a portion of the one or more MAC PDUs that are to be transmitted on the remaining consecutive resources where the LBT successes. Please refer to FIG. 6 again, a portion of the one or more MAC PDUs that to be transmitted on the $2^{nd}$ resource and the $3^{rd}$ resource successes will be transmitted, if the LBT for the $2^{nd}$ resource and the $3^{rd}$ resource successes; a portion of the one or more MAC PDUs that to be transmitted on at least the $1^{st}$ resource will not be transmitted.

In some embodiments, consecutive transmission of the one or more MAC PDUs are perform for SL communication on unlicensed band, method 200 further includes an operation of determining a CAPC value for LBT before performing consecutive (re-)transmission of the one or more MAC PDUs.

In some embodiments, if an LBT failure occurs for specific resource(s) of a number of consecutive resources, the UE determines a CAPC value for LBT according to all CAPC values of a portion of the one or more MAC PDUs to be transmitted in remaining consecutive resources of the number of consecutive resources. In some embodiments, the CAPC value is determined according to at least one of:

- a highest CAPC value among all CAPC values of the portion of the one or more MAC PDUs;
- a CAPC value of an MAC PDU that has an LCH having a highest priority among all LCHs of the portion of the one or more MAC PDUs; or
- a CAPC value of an MAC PDU with a remaining PDB or latency requirement among the portion of the one or more MAC PDUs.

Figure 7:
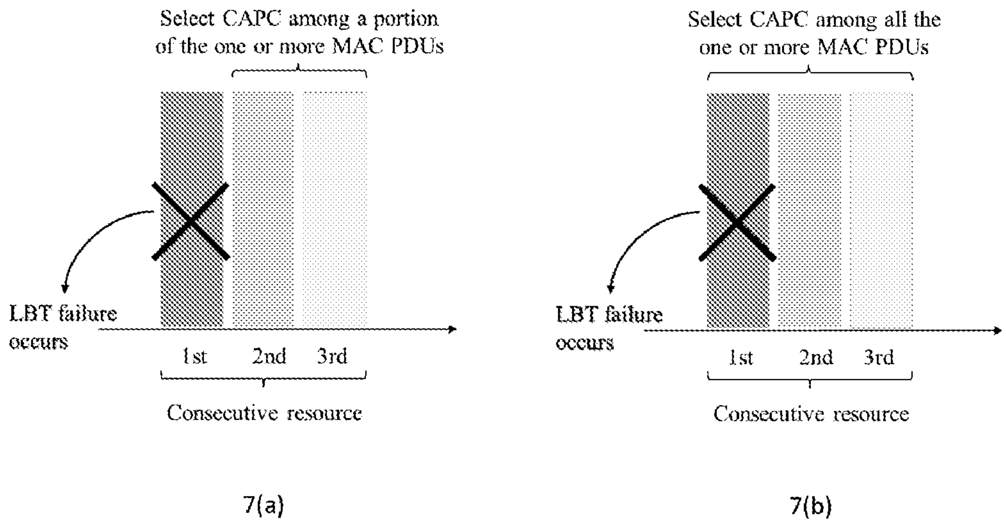
FIG. 7 (including 7(*a*) and 7(*b*)) illustrates exemplary CAPC value selection for LBT according to some embodiments of the present disclosure.

Please refer to FIG. 7(*a*) as an example, in this example, total 3 consecutive resources in time domain are used for consecutive transmission of one or more different MAC PDUs; an LBT failure occurs for the first resource of the 3 consecutive resources, then the UE selects a CAPC value for LBT among all CAPC values of a portion of the one or more MAC PDUs that will be transmitted in the remain consecutive resources (the second resource and the third resource). For example, the CAPC value may be a highest CAPC value among all CAPC values of the portion of the one or more MAC PDUs that to be transmitted on the second resource and the third resource.

In some embodiments, if an LBT failure occurs for specific resource(s) of a number of consecutive resources, the UE determines the CAPC value for LBT among all CAPC values of the one or more MAC PDUs that to be transmitted in the number of consecutive resources. In some embodiments, the CAPC value is determined according to at least one of:

- a highest CAPC value among all CAPC values of the one or more MAC PDUs;
- a CAPC value of an MAC PDU that has an LCH having a highest priority among the one or more MAC PDUs; or
- a CAPC value of an MAC PDU with a remaining PDB or latency requirement among the one or more MAC PDUs.

Please refer to FIG. 7(*b*) as an example, in this example, total 3 consecutive resources in time domain are used for consecutive transmission of one or more different MAC PDUs; an LBT failure occurs for the first resource of the 3 consecutive resources for consecutive transmission, then the UE selects a CAPC value for LBT among all CAPC values of the one or more MAC PDUs that will be transmitted in the 3 consecutive resources (including the first resource where the LBT failure occurs). For example, the CAPC value may be a highest CAPC value among all CAPC values of the one or more MAC PDUs that to be transmitted on the total 3 consecutive resources.

Figure 8:
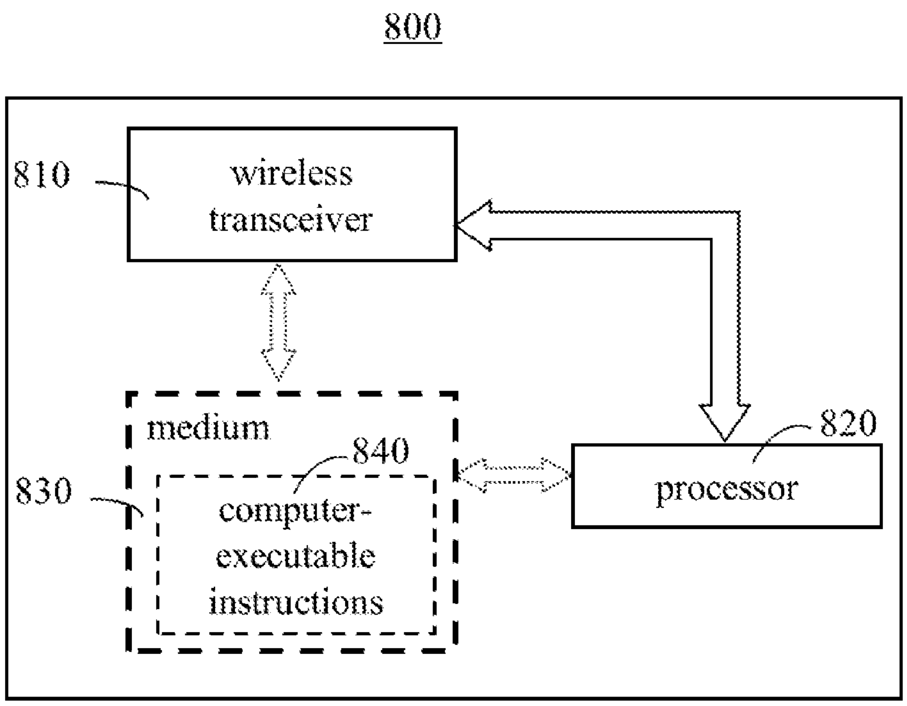
FIG. 8 illustrates a simplified block diagram of an exemplary apparatus according to some embodiments of the present disclosure.

FIG. 8 illustrates a simplified block diagram of an exemplary apparatus 800 according to various embodiments of the present disclosure. In some embodiments, the apparatus 800 may be or include at least a part of a UE or similar device having similar functionality.

As shown in FIG. 8, the apparatus 800 may include at least wireless transceiver 810 and processor 820, wherein wireless transceiver 810 may be coupled to processor 820. Furthermore, the apparatus 800 may include non-transitory computer-readable medium 830 with computer-executable instructions 840 stored thereon, wherein non-transitory computer-readable medium 830 may be coupled to processor 820, and computer-executable instructions 840 may be configured to be executable by processor 820. In some embodiments, wireless transceiver 810, non-transitory computer-readable medium 830, and processor 820 may be coupled to each other via one or more local buses.

Although in FIG. 8, elements such as wireless transceiver 810, non-transitory computer-readable medium 830, and processor 820 are described in the singular, the plural is contemplated unless limitation to the singular is explicitly stated. In certain embodiments of the present disclosure, the apparatus 800 may further include other components for actual usage.

In some embodiments, the apparatus 800 is a UE or at least a part of a UE. In some embodiments, the processor 820 is configured to with the wireless transceiver 810:

- determine a first number for consecutive transmission of a second number of MAC PDUs in time domain, herein at most the second number of MAC PDUs (or a portion of the second number of MAC PDUs) are to be consecutively transmitted on at most the first number of consecutive resources in time domain;
- determine one or more MAC PDUs of the second number of MAC PDUs to be transmitted;
- select first consecutive resources for initial transmission of the one or more MAC PDUs from available resources indicated by a physical layer, wherein the first consecutive resources include at most the first number of consecutive resources; and
- select a corresponding second consecutive resources from remainder of the available resources for each retransmission of the one or more MAC PDUs.

In some embodiments, the processor 820 is further configured to, with the wireless transceiver, perform aforementioned various methods and embodiments.

In some embodiments, the processor 820 performs the following procedure with the wireless transceiver 810 for consecutive transmission of multiple different MAC PDUs (including initial transmission and retransmission(s)):

- Step 1: determining multiple different MAC PDUs that available for transmission
- Step 2: determining a remaining COT duration available for consecutive transmission
- Step 3: determining the number of consecutive resources in time domain for transmission within the remaining COT duration
- Step 4: determining one or more MAC PDUs that will be transmitted in consecutive resource with the multiple different MAC PDUs;
  - in the case that the consecutive resource cannot accommodate all the multiple different MAC PDUs, select one or more MAC PDUs to be transmitted first from the multiple different MAC PDUs according to e.g., a transmission order of the multiple different MAC PDUs;
- Step 5: determining the frequency resource and remaining PDB for consecutive transmission for a physical layer to determine available resources;
- Step 6: selecting consecutive resources for initial transmission within the available resources;
- Step 7: determining consecutive resource number for each retransmission, and selecting consecutive resource for each retransmission;
- Step 8: using an SCI to indicate time domain resource number of consecutive transmissions, e.g., for a PSSCH or PSCCH duration;

Step 9: determining CAPC value for LBT before performing each consecutive transmission It is contemplate that the present disclosure is not limited to this procedure.

In various example embodiments, processor 820 may include, but is not limited to, at least one hardware processor, including at least one microprocessor such as a CPU, a portion of at least one hardware processor, and any other suitable dedicated processor such as those developed based on for example Field Programmable Gate Array (FPGA) and Application Specific Integrated Circuit (ASIC). Further, processor 820 may also include at least one other circuitry or element not shown in FIG. 8.

In various example embodiments, non-transitory computer-readable medium 830 may include at least one storage medium in various forms, such as a volatile memory and/or a non-volatile memory. The volatile memory may include, but is not limited to, for example, an RAM, a cache, and so on. The non-volatile memory may include, but is not limited to, for example, an ROM, a hard disk, a flash memory, and so on. Further, non-transitory computer-readable medium 830 may include, but is not limited to, an electric, a magnetic, an optical, an electromagnetic, an infrared, or a semiconductor system, apparatus, or device or any combination of the above.

Further, in various example embodiments, exemplary apparatus 800 may also include at least one other circuitry, element, and interface, for example antenna element, and the like.

In various example embodiments, the circuitry, parts, elements, and interfaces in exemplary apparatus 800, including processor 820 and non-transitory computer-readable medium 830, may be coupled together via any suitable connections including, but not limited to, buses, crossbars, wiring and/or wireless lines, in any suitable ways, for example electrically, magnetically, optically, electromagnetically, and the like.

The methods of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

The terms "includes," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "including," "having," and the like, as used herein, are defined as "comprising."

In this disclosure, relational terms such as "first," "second," and the like may be used solely to distinguish one entity or action from another entity or action without necessarily requiring or implying any actual such relationship or order between such entities or actions.

We claim:

1. A user equipment (UE) for wireless communication, comprising:

at least one memory; and at least one processor coupled with the at least one memory and configured to cause the UE to:

determine a first number of consecutive resources for consecutive transmission of a second number of medium access control (MAC) protocol data units (PDUs);

determine one or more MAC PDUs of the second number of MAC PDUs to be transmitted;

select first consecutive resources for initial transmission of the one or more MAC PDUs from available resources indicated by a physical layer, wherein the first consecutive resources include at most the first number of consecutive resources; and select a corresponding second consecutive resources from a remainder of the available resources for each retransmission of the one or more MAC PDUs.

2. The UE of claim 1, wherein the first number of consecutive resources are determined within a remaining channel occupancy time (COT) duration by excluding a portion occupied by a physical sidelink feedback channel (PSFCH) from an available COT duration.

3. The UE of claim 2, wherein the first number is determined based on at least one of the second number or the COT duration.

4. The UE of claim 1, wherein, to determine the one or more MAC PDUs of the MAC PDUs to be transmitted in the consecutive resources, the at least one processor is further configured to cause the UE to:

if the first number of consecutive resources is able to accommodate the second number of MAC PDUs, determine the one or more MAC PDUs to be the second number of MAC PDUs.

5. The UE of claim 1, wherein, to determine the one or more MAC PDUs of the MAC PDUs to be transmitted in the consecutive resources, if the first number of consecutive resources are not able to accommodate the second number of MAC PDUs, the at least one processor is further configured to cause the UE to:

determine a transmission order of the second number of MAC PDUs; and determine the one or more MAC PDUs from the second number of MAC PDUs to be transmitted first according to the determined transmission order.

6. The UE of claim 5, wherein the transmission order of the second number of MAC PDUs is determined based at least on one of:

a data arrival time of a highest priority logical channel (LCH) of each of the second number of MAC PDUs or triggered time of MAC control elements (CEs) of each of the second number of MAC PDUs;

a remaining packet delay budget (PDB) of the highest priority LCH for each of the second number of MAC PDUs or a latency requirement of the triggered MAC CEs for each of the second number of MAC PDUs;

a priority of the highest priority LCH or a priority of the triggered MAC CEs of each of the second number of MAC PDUs; or a channel access priority class (CAPC) of the highest priority LCH or a CAPC of the triggered MAC CEs for each of the second number of MAC PDUs.

7. The UE of claim 1, wherein before selecting the first consecutive resources for the one or more MAC PDUs and selecting the second consecutive resources for each retransmission of the one or more MAC PDUs, the at least one processor is configured to cause the UE to:

determine a unified frequency resource number and a unified remaining packet delay budget (PDB) for each of the one or more MAC PDUs;

notify the determined unified frequency resource number and the determined unified remaining PDB to the physical layer for determining the available resources by the physical layer; and receive notification of the available resources from the physical layer.

8. The UE of claim 7, wherein the unified frequency resource number for each of the one or more MAC PDUs is determined based on at least one of:

a first frequency resource number of a MAC PDU with a largest number of frequency resources among the one or more MAC PDUs;

a second frequency resource number of a MAC PDU which has an LCH with a highest priority among LCHs of the one or more MAC PDUs; or a third frequency resource number of a MAC PDU with a highest channel access priority class (CAPC) priority among the one or more MAC PDUs.

9. The UE of claim 7, wherein the unified remaining PDB for each of the one or more MAC PDUs is determined based on at least one of:

a smallest remaining PDB among remaining PDBs of the one or more MAC PDUs;

a remaining PDB of a MAC PDU which has an LCH with a highest priority among LCHs of the one or more MAC PDUs; or a remaining PDB of a MAC PDU with a highest CAPC priority among the one or more MAC PDUs.

10. The UE of claim 1, wherein the at least one processor is further configured to cause the UE to determine a channel access priority class (CAPC) value for listen before transmission (LBT) before performing the consecutive transmission of the one or more MAC PDUs.

11. A processor for wireless communication, comprising:

at least one controller coupled with at least one memory and configured to cause the processor to:

determine a first number of consecutive resources for consecutive transmission of a second number of medium access control (MAC) protocol data units (PDUs);

determine one or more MAC PDUs of the second number of MAC PDUs to be transmitted;

select first consecutive resources for initial transmission of the one or more MAC PDUs from available resources indicated by a physical layer, wherein the first consecutive resources include at most the first number of consecutive resources; and select a corresponding second consecutive resources from a remainder of the available resources for each retransmission of the one or more MAC PDUs.

12. The processor of claim 11, wherein the first number of consecutive resources are determined within a remaining channel occupancy time (COT) duration by excluding a portion occupied by a physical sidelink feedback channel (PSFCH) from an available COT duration.

13. The processor of claim 12, wherein the first number is determined based on at least one of the second number or the COT duration.

14. The processor of claim 11, wherein, to determine the one or more MAC PDUs of the MAC PDUs to be transmitted in the consecutive resources, the at least one controller is configured to cause the processor to, if the first number of consecutive resources is able to accommodate the second number of MAC PDUs, determine the one or more MAC PDUs to be the second number of MAC PDUs.

15. The processor of claim 11, wherein, to determine the one or more MAC PDUs of the MAC PDUs to be transmitted in the consecutive resources, if the first number of consecutive resources are not able to accommodate the second number of MAC PDUs, the at least one controller is configured to cause the processor to:

determine a transmission order of the second number of MAC PDUs; and determine the one or more MAC PDUs from the second number of MAC PDUs to be transmitted first according to the determined transmission order.

16. The processor of claim 15, wherein the transmission order of the second number of MAC PDUs is determined based at least on one of:

a data arrival time of a highest priority logical channel (LCH) of each of the second number of MAC PDUs or triggered time of MAC control elements (CEs) of each of the second number of MAC PDUs;

a remaining packet delay budget (PDB) of the highest priority LCH for each of the second number of MAC PDUs or a latency requirement of the triggered MAC CEs for each of the second number of MAC PDUs;

a priority of the highest priority LCH or a priority of the triggered MAC CEs of each of the second number of MAC PDUs; or a channel access priority class (CAPC) of the highest priority LCH or a CAPC of the triggered MAC CEs for each of the second number of MAC PDUs.

17. The processor of claim 11, wherein before selecting the first consecutive resources for the one or more MAC PDUs and selecting the second consecutive resources for each retransmission of the one or more MAC PDUs, the at least one controller is configured to cause the processor to:

determine a unified frequency resource number and a unified remaining packet delay budget (PDB) for each of the one or more MAC PDUs;

notify the determined unified frequency resource number and the determined unified remaining PDB to the physical layer for determining the available resources by the physical layer; and receive notification of the available resources from the physical layer.

18. The processor of claim 17, wherein the unified frequency resource number for each of the one or more MAC PDUs is determined based on at least one of:

a first frequency resource number of a MAC PDU with a largest number of frequency resources among the one or more MAC PDUs;

a second frequency resource number of a MAC PDU which has an LCH with a highest priority among LCHs of the one or more MAC PDUs; or a third frequency resource number of a MAC PDU with a highest channel access priority class (CAPC) priority among the one or more MAC PDUs.

19. The processor of claim 17, wherein the unified remaining PDB for each of the one or more MAC PDUs is determined based on at least one of:

a smallest remaining PDB among remaining PDBs of the one or more MAC PDUs;

a remaining PDB of a MAC PDU which has an LCH with a highest priority among LCHs of the one or more MAC PDUs; or a remaining PDB of a MAC PDU with a highest CAPC priority among the one or more MAC PDUs.

20. A method performed by a user equipment (UE), the method comprising:

determining a first number of consecutive resources for consecutive transmission of a second number of medium access control (MAC) protocol data units (PDUs);

determining one or more MAC PDUs of the second number of MAC PDUs to be transmitted;

selecting first consecutive resources for initial transmission of the one or more MAC PDUs from available resources indicated by a physical layer, wherein the first consecutive resources include at most the first number of consecutive resources; and selecting a corresponding second consecutive resources from a remainder of the available resources for each retransmission of the one or more MAC PDUs.

* * * * *